US007905251B2

(12) United States Patent
Flanders

(10) Patent No.: US 7,905,251 B2
(45) Date of Patent: Mar. 15, 2011

(54) METHOD FOR WELLHEAD HIGH INTEGRITY PROTECTION SYSTEM

(75) Inventor: Patrick S. Flanders, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 897 days.

(21) Appl. No.: 11/648,312

(22) Filed: Dec. 29, 2006

(65) Prior Publication Data

US 2008/0156077 A1 Jul. 3, 2008

(51) Int. Cl.
*F17D 1/00* (2006.01)
*F16K 17/00* (2006.01)

(52) U.S. Cl. ............... 137/601.14; 137/599.01; 137/870; 137/883

(58) Field of Classification Search ............. 137/599.01, 137/599.05, 599.06, 599.07, 601.14, 870, 137/883, 461
See application file for complete search history.

(56) References Cited

U.S. PATENT DOCUMENTS 1,246,803 A 11/1917 Doti
4,521,221 A * 6/1985 Richter et al. ............... 48/127.3
4,848,393 A 7/1989 West
5,730,166 A * 3/1998 Ackerley et al. .................. 137/2
6,090,294 A 7/2000 Teran
6,739,804 B1 5/2004 Haun
7,478,012 B2 * 1/2009 Tewes et al. .................. 702/183
2002/0145515 A1 * 10/2002 Snowbarger et al. ......... 340/514
2004/0093173 A1 * 5/2004 Essam ............................ 702/51
2005/0199286 A1 * 9/2005 Appleford et al. ......... 137/487.5
2006/0150640 A1 7/2006 Bishop
2006/0219299 A1 10/2006 Snowbarger
2006/0220844 A1 10/2006 Flanders

OTHER PUBLICATIONS

International Search Report for PCT/US07/24924, mailed May 29, 2008.
IPRP for PCT/US07/24924, mailed Aug. 4, 2009.

* cited by examiner

*Primary Examiner* — Stephen Hepperle
*Assistant Examiner* — William McCalister
(74) *Attorney, Agent, or Firm* — Abelman, Frayne & Schwab

(57) ABSTRACT

A high integrity protection system (HIPS) for protection of a pipe downstream of a wellhead includes an inlet connected to the wellhead; outlet connected to the downstream pipe; two sets of two series-connected surface safety valves (SSVs) in fluid communication with the inlet and outlet, the sets being in parallel fluid flow relation to each other, either one or both of the sets of SSVs operable as a flowpath for fluids entering the inlet and passing through the outlet to the downstream pipe; two vent control valves (VCVs), each connected to piping intermediate one set of series-connected SSVs, the VCVs being in fluid communication with a vent line, whereby, upon opening of a VCV, process pressure between the two SSVs is vented; a signal-generating safety logic solver, in accordance with preprogrammed safety and operational protocols; and pressure sensing transmitters attached to piping upstream of the HIPS outlet.

9 Claims, 3 Drawing Sheets

METHOD FOR WELLHEAD HIGH INTEGRITY PROTECTION SYSTEM

FIELD OF THE INVENTION

The present invention relates to a method and an apparatus for the operation and testing of a high integrity protection system (HIPS) connected to a wellhead pipeline system.

BACKGROUND OF THE INVENTION

In the oil and gas industry, production fluid pipelines downstream of the wellhead are generally thin-walled in order to minimize the cost of the pipeline. It is therefore necessary that such pipelines be protected against excessive pressure that might rupture the pipe, which would be very expensive to replace and cause environmental pollution. A conventional system used to protect pipelines from over-pressure is the high integrity protection system (HIPS). This is typically an electro-hydraulic system employing pressure sensors to measure the pressure in the pipes which are used through the electronics of a control module to control the closure of a production pipe HIPS valve. This arrangement retains the high pressure within a short section of pipeline between the production tree and the HIPS valve which is capable of withstanding the pressure. This prevents the main, thinner-walled section of the pipeline from being exposed to pressure levels which may exceed the pipeline's pressure rating.

It is a necessary requirement that the safety of the HIPS be tested regularly since a malfunction in operation of the HIPS presents the risk of significant damage to the pipeline. The conventional system cannot be tested during its operation. Thus, the production system has to cease operations and be isolated for the test. The interruption of operations has serious financial implications. In addition, at least one operator has to be close to the HIPS during the test, since operations of valves and other components are performed by people manually.

Various approaches have been proposed for testing and protecting valves and pipeline systems from overpressure. For example, published application U.S. 2005/0199286 discloses a high integrity pressure protection system in which two modules connected to two downstream pipelines and two upstream pipelines have inlet and outlet ports. A conduit circuit connects the two ports and a docking manifold is installed in the pipeline between upstream and downstream portions. The docking manifold selectively routes flows in each of the first and second pipelines through the first or second module. The system permits routing of flows from upstream regions of both of the pipelines through one of the module and then to a downstream region of one of the pipelines to permit the other module to be removed for maintenance, repair and/or replacement. There is no disclosure or suggestion of an apparatus or method for testing the operation of the system while it is in operation.

For example, U.S. Pat. No. 6,591,201 to Hyde discloses a fluid energy pulse test system in which energy pulses are utilized to test dynamic performance characteristics of fluid control devices and systems, like gas-lift valves. This test system is useful for testing surface safety valves in hydraulic circuits, but does not provide safety information of the overall system's ability to perform safety function.

U.S. Pat. No. 6,880,567 to Klaver, et al. discloses a system that includes sensors, a safety control system and shut off valves used for protecting downstream process equipment from overpressure. This system utilizes a partial-stroke testing method in which block valves are closed until a predetermined point and then reopened. This system, however, has to interrupt production for the diagnostic testing.

U.S. Pat. No. 7,044,156 to Webster discloses a pipeline protection system in which pressure of fluid in a section of pipeline that exceeds a reference pressure of the hydraulic fluid supplied to a differential pressure valve, the differential pressure valve is opened, and thereby causes the hydraulic pressure in the hydraulically actuated valve to be released via a vent. The protection system, however, does not provide any valve diagnostic means and is forced to interrupt the production for shut off valves to be fully closed.

U.S. Pat. No. 5,524,484 to Sullivan discloses a solenoid-operated valve diagnostic system which permits the valve user with the ability to monitor the condition of the valve in service over time to detect any degradation or problems in the valve and its components and correct them before a failure of the valve occurs. This system does not permit a testing of shut off valves without an interruption of production.

U.S. Pat. No. 4,903,529 to Hodge discloses a method for testing a hydraulic fluid system in which a portable analyzing apparatus has a supply of hydraulic fluid, an outlet conduit, a unit for supplying hydraulic fluid under pressure from the supply to the outlet conduit, a return conduit communicating with the supply, a fluid pressure monitor connected to the outlet conduit, and a fluid flow monitor in the return conduit. The analyzing apparatus disconnects the fluid inlet of the device from the source and connects the fluid inlet to the outlet conduit, and disconnects the fluid outlet of the device from the reservoir and connects that fluid outlet to the return conduit. Fluid pressure is monitored in the outlet conduit and the flow of fluid through the return conduit with the unit in place in the system. This method, however, requires that the production be interrupted for the testing of the hydraulic system.

U.S. Pat. No. 4,174,829 to Roark, et al. discloses a pressure sensing safety device in which a transducer produces an electrical signal in proportion to a sensed pressure and a pilot device indicates a sensing out-of-range pressure when the sensed pressure exceeds a predetermined range, which permits an appropriate remedial action to be taken if necessary. The device requires operators intervention.

U.S. Pat. No. 4,215,746 to Hallden, et al. discloses a pressure responsive safety system for fluid lines which shuts in a well in the event of unusual pressure conditions in the production line of the well. Once the safety valve has closed, a controller for detecting when the pressure is within a predetermined range is latched out of service and must be manually reset before the safety valve can be opened. The system results in an interruption of production and operators intervention.

It is therefore an object of the present invention to provide an apparatus and a method for testing the HIPS while it is in operation while the HIPS operates as a flowline to a piping system and without shutting down the production line to which it is connected.

Another object is to provide an apparatus and a method for automatically testing a safety of a HIPS without the intervention of an operator.

The unit is preferably provided with standardized flanges and is integrally constructed.

SUMMARY OF THE INVENTION

The above objects, as well as other advantages described below, are achieved by the method and apparatus of the invention which provides a high integrity protection system (HIPS) which protects and tests the control of a piping system connected to a wellhead. The HIPS of the present invention has an inlet for connection to the wellhead and an outlet for connection to the downstream piping system and, in a preferred embodiment, is constructed as a skid-mounted integral system for transportation to the site where it is to be installed.

The HIPS comprises two sets of surface safety valves (SSVs), two vent control valves (VCVS) and a safety logic solver. The two sets of SSVs are in fluid communication with the inlet, and the two sets are in parallel with each other. Each set of SSVs has two SSVs in series, and either one or both of the two sets of SSVs is operable as a flowline for fluids entering the inlet and passing through the HIPS outlet for the piping system. Each of the VCVs is connected to piping intermediate the two sets of SSVs, and each of the VCVs is in fluid communication with a vent line, which upon opening of a VCV vents hydraulic pressure between the two SSVs. The safety logic solver is in communication with the SSVs and the VCVs and produces signals to control the operation of the SSVs and VCVs. The VCVs are preferably electrically operated.

The pressure sensing transmitters monitor the flowline pressure on a section of piping upstream of the HIPS outlet. In a preferred embodiment, three pressure transmitters are provided on the outlet. The logic solver is programmed to transmit a signal to close the SSVs upon an increase in pressure above a threshold value transmitted by at least two of the three pressure sensors. As will be apparent to one of ordinary skill in the art, more or less than three pressure sensors can be employed in this part of the system.

Each of the two VCVs is connected to a flowline that is fluid communication with a common vent line. The vent line can be connected to a reservoir tank or other storage or recirculating means. Each set of SSVs is operable independently of the operation of the parallel set of SSVs. Pressure sensing transmitters are positioned for monitoring the pressure between the SSVs in each of the two sets of SSVs.

In a preferred embodiment, the safety logic solver is programmed to maintain one set of the SSVs in an open position when the parallel set of SSVs is moved to a closed position from an open position during a full-stroke test. In addition, the safety logic solver is programmed to measure and record the pressure between a pair of the closed SSVs during a tight shut-off test, and to open the VCV between the closed SSVs for a short period of time during the test to relieve or reduce the line pressure.

In another preferred embodiment, the safety logic solver is programmed to generate a failure signal during the tight shut-off test period if the pressure between the closed and vented SSVs rises above a predetermined threshold value following closing of the VCV. In still another preferred embodiment, the safety logic solver is programmed to designate the closed SSVs for use as an operating set of SSVs if, during the test period, the pressure between the closed SSVs does not rise above a predetermined threshold value.

The VCVs are closed during normal operations and during a full-stroke test.

The HIPS of the invention further comprises manual shut-off valves positioned upstream and downstream of each of the parallel sets of SSVs, which can be used to isolate each of the SSV sets from the piping system, e.g., for maintenance, repairs and/or replacement of system components.

In a preferred embodiment, the SSVs are provided with electric failsafe valve actuators, whereby all of the valves are moved to a closed position in the event of a power failure. This would result in a termination of all fluid flow in the pipeline downstream of the HIPS. As will be apparent to those of ordinary skill in the art, this type of failsafe shut down would be coordinated with similar shut down requirements at the wellhead or elsewhere upstream of the HIPS.

In another aspect of the invention, a method is provided to test the operational safety of an HIPS that is connected to a wellhead pipeline system. The HIPS has first and second sets of surface safety valves (SSVs) in fluid communication with the piping system, and the two sets are in parallel with each other. Each set of SSVs has two SSVs in series, and the SSVs are operable in response to signals from a safety logic solver as was described in detail above.

The first set of SSVs moves from an open position to a closed position for a tight shut-off safety test while the second set of SSVs is open as a flowline for the pipeline system.

A transmitter positioned between the closed SSVs transmits a signal to the safety logic solver that corresponds to the pressure of fluid in the piping between the two closed valves. The VCV located between the closed set of SSVs vents the pressurized fluid between the closed SSVs at the beginning of the safety test. The vented fluid is preferably passed to a reservoir. An alarm signal is actuated if the first set of SSVs do not maintain the pressure in piping between the SSVs at or below a predetermined threshold level during a predetermined shut down time.

The pressure, e.g., in PSI, of the fluid in the section of piping between each set of SSVs is recorded before and during the safety shutoff testing of the valves. A graphic display of the recorded pressure is preferably provided to assist operating personnel in evaluating the performance of the system in real time during the test.

The second set of SSVs remains open while the first set of SSVs return to the fully open position. If the first set of SSVs do not open fully, an alarm signal is actuated. Each of the two sets of surface safety valves is provided with a vent control valve (VCV). The VCV connected to the first set of SSVs opens for a predetermined period of time to effect the pressure venting after the first set of SSVs are fully closed.

The first set of SSVs are moved to the open position and the second set of SSVs are moved to the closed position. The pressure between the SSVs of the second set of SSVs is measured and an alarm signal is actuated if the second set of SSVs do not maintain the pressure in the intermediate piping at or below a predetermined level.

BRIEF DESCRIPTION OF THE DRAWINGS

The present invention will be further described below and in conjunction with the accompanying drawings in which.

Figure 1:
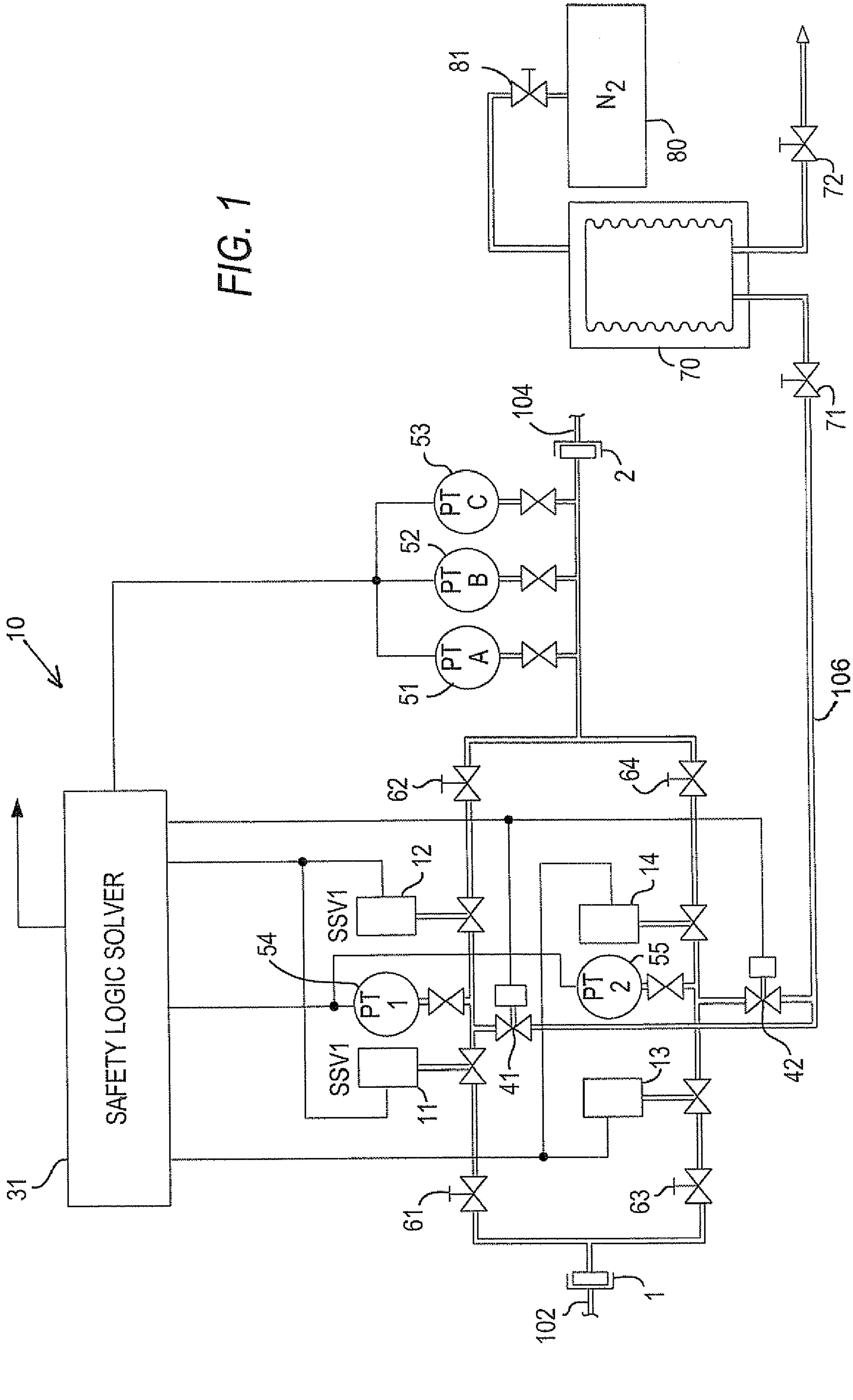
FIG. 1 is a schematic diagram of a high integrity protection system (HIPS) in accordance with the invention that is connected to a wellhead and a downstream pipeline.

To facilitate an understanding of the invention, the same reference numerals have been used, when appropriate, to designate the same or similar elements that are common to the figures. Unless stated otherwise, the features shown and described in the figures are not drawn to scale, but are shown for illustrative purposes only.

DETAILED DESCRIPTION OF THE INVENTION

Referring to FIG. 1, a high integrity protection system (HIPS) 10 is installed in proximity to a wellhead in a piping system to convey a pressurized fluid product, such as oil or gas, from the wellhead 102 to a remote host location via pipeline 104. The HIPS has an inlet 1 connected to the wellhead piping 102 and an outlet 2 connected to piping system 104 through which the liquid product enters and exits the HIPS 10. The HIPS is preferably skid-mounted for delivery to the site of the wellhead and is provided with appropriate flanges and adapters, if necessary, for attachment to the inlet and outlet to the oil field piping.

Two sets of surface safety valves (SSVs) 11, 12 and 13, 14 are in fluid communication with the inlet 1 and the outlet 2 are thereby operable as a flowline for the fluid product. Each set of SSVs, identified and referred to as SSV-1 and SSV-2, has two SSVs 11-12 and 13-14, respectively, which are connected in series. The SSVs close automatically in the absence of power being supplied to them and are maintained in an open position by conventional hydraulically or electrically powered actuators to protect the downstream piping system 104 from abnormal operational conditions.

Two vent control valves (VCVs) 41, 42 are connected to the piping intermediate the two set of SSVs 11, 12 and 13, 14, respectively, and are in fluid communication with a vent line 106. The vent line 106 is in fluid communication with a fluid reservoir 70 that serves as a closed collection system tank. Alternatively, the vent line can be routed to a burn pit (not shown) near the well site. The VCVs 41, 42 upon their opening can vent pressurized fluid between the two SSVs into the vent line 106. Valves 71,72 and 81 control supply of hydraulic pressure by the pressure reservoir via their opening and closing. When the valve 81 is opened, pressurized nitrogen from the tank 80 forces fluid out of the reservoir 70, either into the HIPS pipeline or via valve 72 for alternate use or disposed. The VCVs 41, 42 vent pressurized fluid from between the two SSVs into the vent line upon their opening. Pressure sensing transmitters 54, 55 are located between the respective SSVs to determine the flowline pressure between the two SSVs. Multiple pressure sensing transmitters can optionally be installed at locations 54 and 55 to assure reliability and as back-ups to the test system.

Pressure sensing transmitters 51, 52, 53 are installed upstream of the outlet 2 to monitor the flowline pressure exiting the HIPS from outlet 2. The three transmitters are monitored by the safety logic solver 31. If any two of three transmitters 51-53 sense a pressure rise above a predetermined threshold value, the logic solver 31 automatically shuts in the well via the SSVs 11-14, thereby protecting the downstream pipeline from excessive pressure.

A safety logic solver 31, which is preferably a software module preprogrammed in a computer or the like, is in communication with the SSVs 11-14, VCVs 41, 42, and pressure sensing transmitters 51-55 via a hard-wired connection or by wireless transmitters. The safety logic solver 31 produces and transmits signals to control the operation of the SSVs 11-14 and VCVs 41, 42. The control is performed based on pressure data from the pressure sensing transmitters 51-55.

Manual valves 61-64 are installed between inlet 1 and outlet 2 and SSVs 11-14 to isolate the two sets of SSVs 11-14 from the piping system in case of an emergency and also so that the system can be shut down manually for repair and/or replacement of any of its components.

All valves are operated by conventional valve actuators (not shown) such as those that are well known to art. The valve actuators and pressure transmitters 51-55 have self-diagnostic capabilities and communicate any faults to the safety logic solver 31 that are detected.

Figure 2:
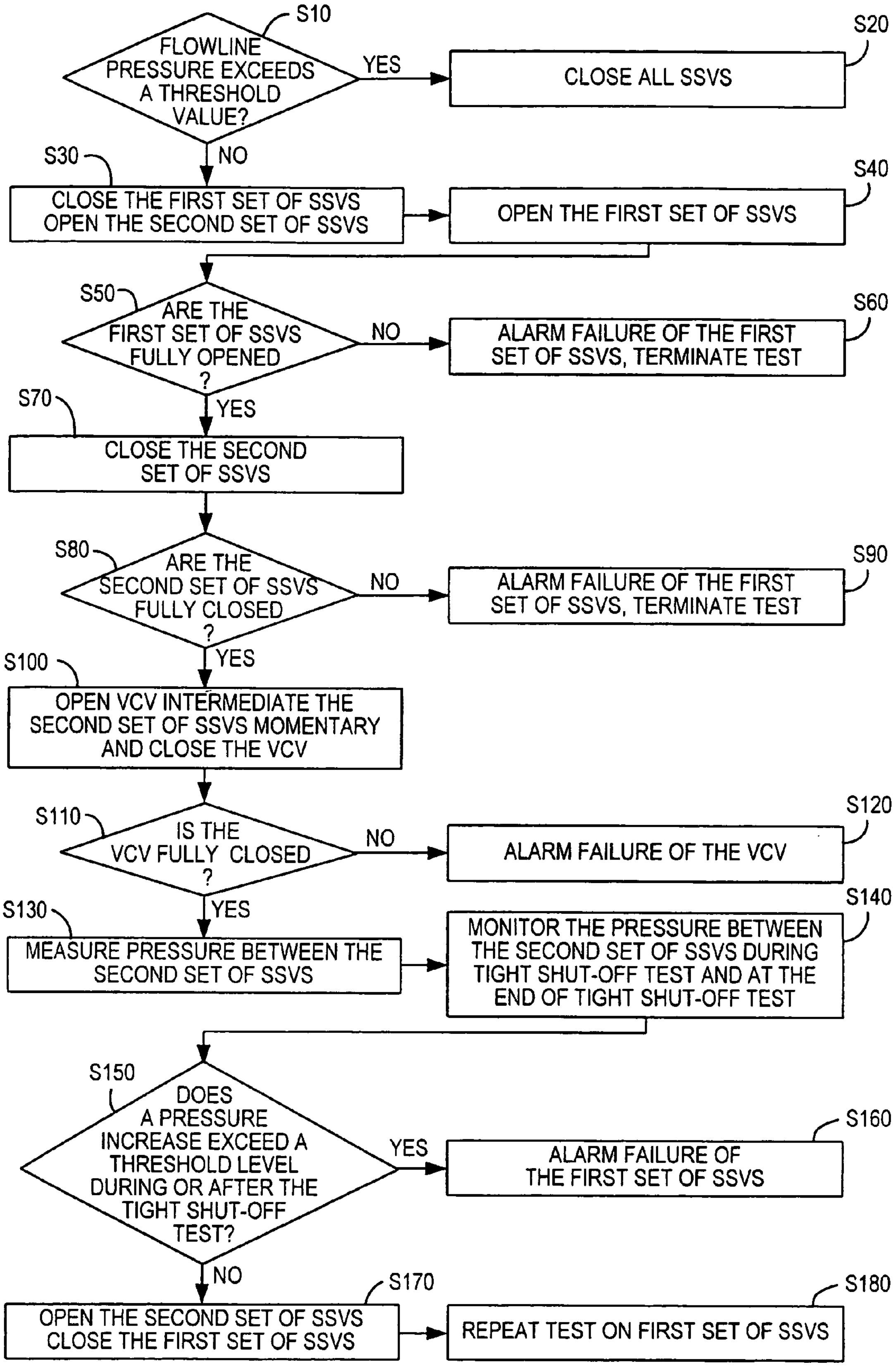
FIG. 2 is a flowchart of the process steps for a tight shut-off test on the HIPS of FIG. 1.

The method for conducting the shut-off test and full-stroke test in accordance with the invention will be described with reference to FIG. 2. Before the commencement of the test, a safety check of the HIPS flowline is made. If the flowline pressure exceeds a predetermined threshold level, all SSVs are closed. (S20) Otherwise, the first set of SSVs 11, 12 are closed and the second set of SSVs 13, 14 are closed. (S30)

The first set of SSVs 11, 12 are then opened to prepare for a test of the second set of SSVs 13, 14. (S 40) It is determined whether the first set of SSVs 11, 12 which are used as a flowline during the shut-off test of the second set of SSVs 13, 14 are fully opened. (S50) If the first set of SSVs 11, 12 are not fully opened, an alarm signal is actuated and the test is terminated (S60). If the first set of SSVs 11, 12 are fully opened, the second set of SSVs 13, 14 are closed. (S70) The full closing of the SSVs 13, 14 to be tested are checked for the preparation of the tight shut-off test. (S80) If the SSVs 13, 14 are not fully closed, an alarm signal is actuated (S90) and the test is terminated.

If the SSVs 13, 14 are fully closed, the tight shut-off test of the SSVs 13, 14 is initiated. The VCV 42 located intermediate the second set of SSVs 13, 14 is opened to reduce the pressure between the SSVs 13, 14 to a stable value (S100).

The VCV 42 is then closed and the pressure sealing of VCV 42 is checked. (S110) If the VCV 42 is not fully closed, or the valve is leaking so that pressure continues to drop in the vented section of pipe between the valves, an alarm signal is actuated (S120) and appropriate remedial action is taken. If the VCV 42 is fully closed, the pressure between the SSVs 13, 14 is measured. (S130) The pressure between the SSVs 13, 14 continues to be monitored by the pressure transmitter 55 and the result is sent to the safety logic solver 31 during the tight shut-off test up to the end of the tight shut-off test period. (S140)

Figure 3:
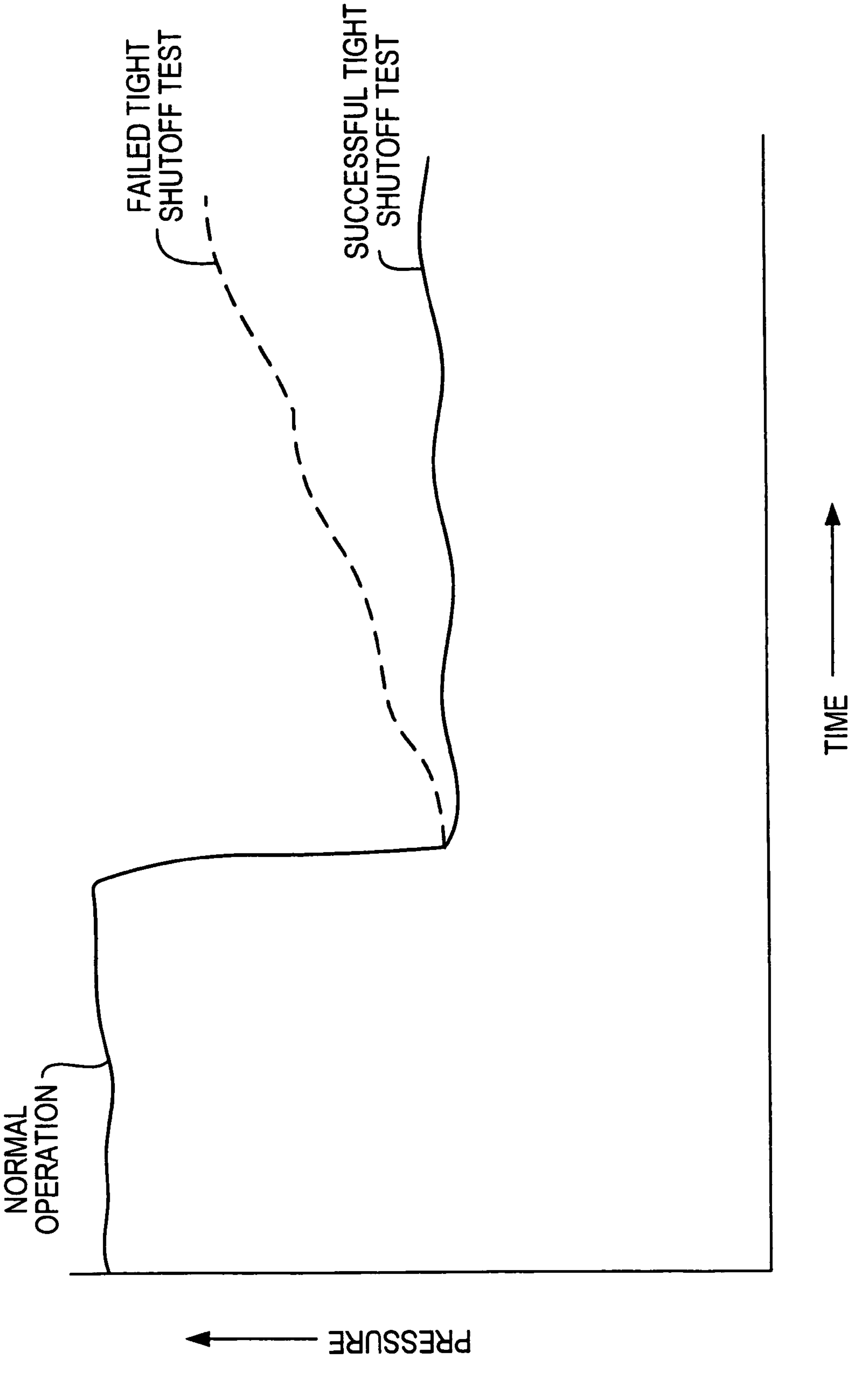
FIG. 3 is a comparative illustrative graphic display illustrating both a satisfactory and a failed pressure test of a pair of surface safety valves (SSVs) during the tight shut-off test.

The data obtained during the tight shut-off test is graphically represented for two different scenarios in FIG. 3. When the VCV 42 is opened, the pressure between the SSVs 13, 14 drops from a normal operating pressure to a lower pressure and the VCV 42 is fully closed. If the pressure between SSVs 13, 14 rises, that is deemed to be evidence that there is leakage in one or both of SSVs 13, 14. Since some minimal amount of leakage may be acceptable, it must be determined whether a pressure increase, or the rate of pressure increase, exceeds a predetermined threshold level during or after the period of the tight shut-off test. (S150) If during the test period, the pressure rises above the threshold level, it indicates a failure in the ability of the SSVs 13, 14 to seat completely and an alarm signal is actuated by the safety logic solver 31 which notifies of the failure of the tight shut-off test of the SSVs 13, 14. (S160). If during the test period, the pressure increase does not exceed the threshold level, the second set of SSVs 13, 14 pass the tight shut-off test. The first set of SSVs 11, 12, were in an open position providing a flowpath for production during the tight shut-off testing of SSVs 13, 14. (S170) To complete the system functional testing, the second set of SSVs 13, 14, which passed the tight shut-off test, are opened again and used as a flowline. (S180)

As will be apparent from the above description, the first set of SSVs 11, 12 is tested using substantially the same methodology.

The present invention enables the HIPS to operate continuously as a flowline while a tight shut-off and a full-stroke test is performed, and while any necessary protective action can be taken. The automatic operation by the safety logic solver assures that emergency shut-off conditions will be carried out, even during a test. A record of the test is stored and can be recovered later or displayed electronically and/or in printed graphic form or as tabulated data.

Although various embodiments that incorporate the teachings of the present invention have been shown and described in detail, other and varied embodiments will be apparent to those of ordinary skill in the art and the scope of the invention is to be determined by the claims that follow.

I claim:

1. A method for the operational safety testing of a high integrity protection system (HIPS) connected to a wellhead pipeline, the method comprising:

providing a HIPS that has first and second sets of surface safety valves (SSVs) in fluid communication with the pipeline, the two sets being in parallel with each other, each set of SSVs having two SSVs in series, the outlet of the second set of SSVs being connected to the outlet of the first set of SSVs such that the outputs of both sets of SSVs proceed through a common outlet pipe, the SSVs being operable in response to signals from a safety logic solver;

moving the first set of SSVs from an open position to a closed position for a tight shut-off safety test while the second set of SSVs is open as a flowline for the pipeline; and actuating an alarm signal if the first set of SSVs do not maintain the pressure in the piping between the SSVs at or below a predetermined threshold level.

2. The method of claim 1 in which at least one pressure sensing transmitter positioned between the closed SSVs transmits a signal to the safety logic solver that corresponds to the pressure of fluid in the piping between the two closed valves.

3. The method of claim 1 which includes venting the pressurized fluid between the closed SSVs at the beginning of the safety test.

4. The method of claim 1 which includes recording the pressure of the fluid in the section of piping between each set of SSVs before and during the safety shutoff testing of the valves.

5. The method of claim 4 which includes providing a display of the recorded pressure levels.

6. The method of claim 1, wherein the second set of SSVs remains open while the first set of SSVs is returned to the fully open position.

7. The method of claim 6, wherein an alarm is actuated if the first set of SSVs do not open fully.

8. The method of claim 1 which includes:

providing each of the two sets of surface safety valves (SSVs) with a vent control valve (VCV); and opening the VCV connected to the first set of SSVs for a predetermined period of time when the first set of SSVs are closed to effect maintaining the pressure in the piping between the SSVs at or below a predetermined threshold level.

9. The method of claim 6 further comprising:

moving the first set of SSVs to the open position;

moving the second set of SSVs to the closed position;

measuring the pressure between the SSVs of the second set of SSVs for a predetermined period of time; and actuating an alarm signal if the second set of SSVs do not maintain the pressure in the intermediate piping at or below a predetermined level.

* * * * *